(12) United States Patent
Huang (10) Patent No.: US 7,561,758 B2
(45) Date of Patent: Jul. 14, 2009

(54) SCANNING MODULE AND THE METHOD THEREOF

(76) Inventor: Shi-Hwa Huang, 2F, No. 14, Lane 133, Chungyang Rd., Hsindian (TW)

( * ) Notice: Subject to any disclaimer, the term of this patent is extended or adjusted under 35 U.S.C. 154(b) by 956 days.

(21) Appl. No.: 10/925,954

(22) Filed: Aug. 26, 2004

(65) Prior Publication Data

US 2006/0044628 A1 Mar. 2, 2006

(30) Foreign Application Priority Data

Oct. 24, 2003 (TW) .............................. 92129493 A (51) Int. Cl.
*H04N 1/04* (2006.01)
*G01N 21/86* (2006.01)
*G02F 1/29* (2006.01)
*G06K 9/20* (2006.01)
*G06K 7/10* (2006.01)

(52) U.S. Cl. .................... 382/312; 358/475; 358/484; 358/474; 250/559.09; 359/299; 359/301; 382/321

(58) Field of Classification Search ............ 358/474, 358/475, 471, 478, 488, 487, 494, 496, 498, 358/509, 510, 511, 513, 481, 482, 484; 359/17, 359/19, 436, 437, 299, 301; 353/8, 20; 250/559.04, 250/559.05, 559.06, 559.07, 559.08, 559.09
See application file for complete search history.

(56) References Cited

U.S. PATENT DOCUMENTS

| | | | |
|---|---|---|---|
| 6,217,173 B1* | 4/2001 | Huang et al. ............... 353/20 |
| 6,256,271 B1* | 7/2001 | McLeod .................. 369/44.23 |
| 6,509,575 B1* | 1/2003 | Nanni ................... 250/559.05 |
| 6,618,516 B1* | 9/2003 | Huang ........................ 385/16 |
| 6,661,520 B1* | 12/2003 | Lin et al. ................... 356/445 |
| 6,741,356 B1* | 5/2004 | Ishiwata et al. ............ 356/491 |
| 2004/0036854 A1* | 2/2004 | Fukuda et al. ............... 356/39 |
| 2004/0113054 A1* | 6/2004 | Majima et al. ............. 250/225 |
| 2004/0125373 A1* | 7/2004 | Oldenbourg et al. ....... 356/364 |
| 2004/0190149 A1* | 9/2004 | Lian et al. .................. 359/629 |
| 2004/0202089 A1* | 10/2004 | Lin ....................... 369/112.16 |
| 2005/0031245 A1* | 2/2005 | Law et al. .................... 385/11 |
| 2005/0135221 A1* | 6/2005 | Wang ................... 369/112.17 |
| 2006/0044628 A1* | 3/2006 | Huang ....................... 358/475 |
| 2006/0164643 A1* | 7/2006 | Giakos ...................... 356/369 |
| 2008/0068712 A1* | 3/2008 | Huang et al. ............... 359/487 |
| 2008/0310791 A1* | 12/2008 | Huang ........................ 385/12 |

* cited by examiner

*Primary Examiner*—Jerome Grant, II
(74) *Attorney, Agent, or Firm*—Workman Nydegger (57) ABSTRACT

The present invention relates to a scanning module, which is capable of integrating optical paths of illuminating and imaging for size reduction, and improving the quality of scanned image by using optical polarizers for filtering, and further achieving the same effect as the "projection scanning" digital camera. The scanning module comprises: a light source, a first polarizer, a quarter-wave plate, a polarizing beamsplitter, an image detection device, and a second polarizer. The light from the light source consists of both a first-polarized and a second-polarized light. The first polarizer is placed in front of the light source that only allows the first-polarized light to pass through. The optics unit directs the first-polarized light to a scanning object and transforms the reflected light into the second-polarized light before receiveded by the image detection device for image acquiring. The second polarizer is placed between the optics unit and the image detection device for allowing only the second-polarized light to pass through such that the influence on the image detection device from the light source can be eliminated.

17 Claims, 10 Drawing Sheets

SCANNING MODULE AND THE METHOD THEREOF

BACKGROUND OF THE INVENTION

1. Field of the Invention

The present invention relates to a scanning module and the method thereof, and more particularly, to a scanning module that is capable of integrating optical paths of illuminating and imaging into one optical path for size reduction, and improving the quality of scanned image by using optical polarizers for filtering such that is capable of further achieving the same effect as the "projection scanning" digital camera.

2. Description of the Prior Art

E-society is coming vigorously and rapidly following the development of science and technologies. From the computer and electronics expositions within the past five years, one can clearly perceive that the electronic products with newer technologies, lower prices, and convenience in usage are commonplace. As a result, the development of the E-society is expedited.

Because of the revolutionary development in the electronics technology, almost everybody are able to operate those electronic devices easily, thus, the standard of living has reached to a very high level in the recent years. Taking image processing for example, two popular means are currently used, i.e. by using digital cameras and by using scanners, and are respectively applied in different applications.

Figure 1A:
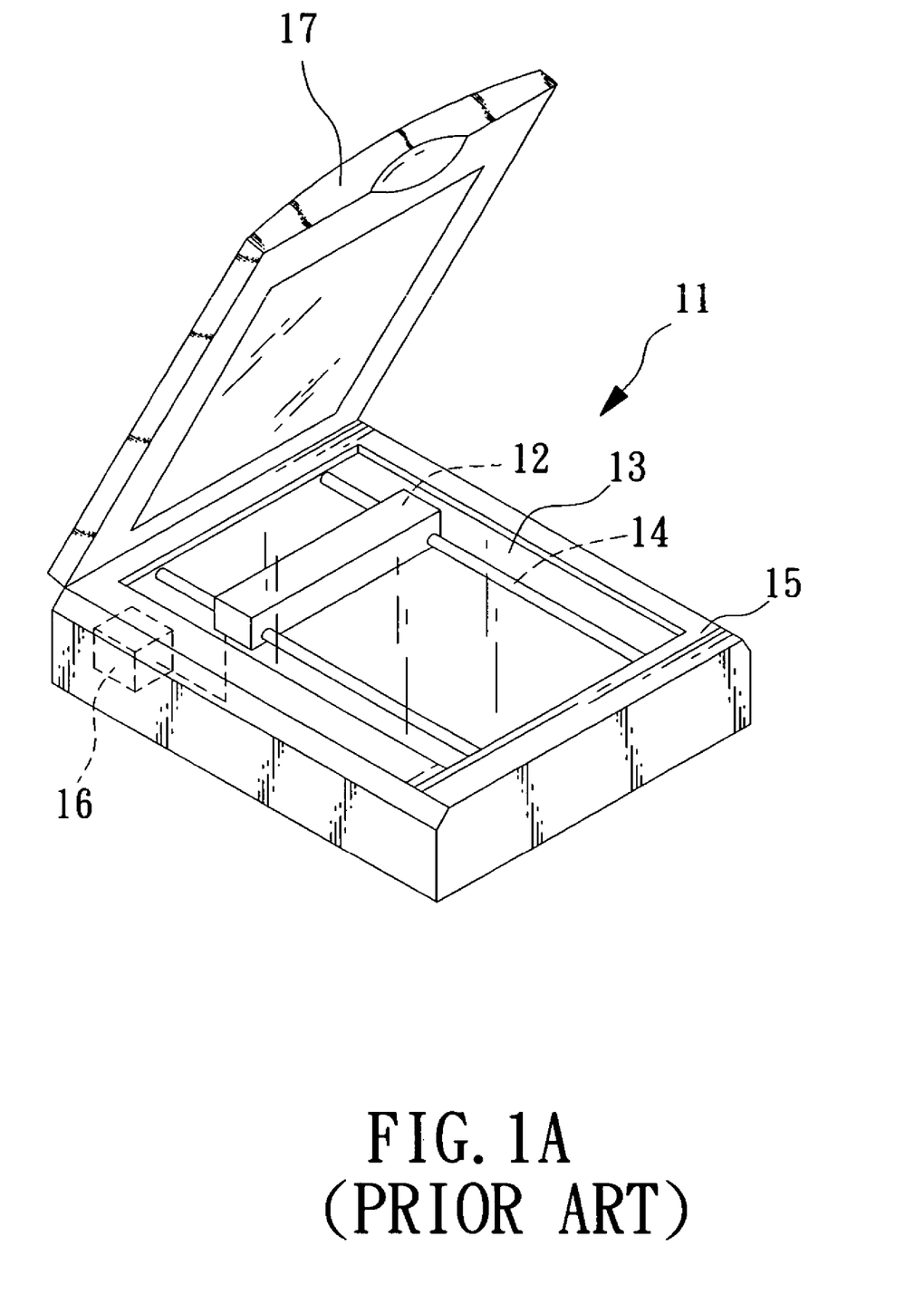
FIG. 1A is a 3-D schematic drawing of a scanning module according to the prior art.

However, there is still room for improvement in both the size and power consumption of a conventional scanner. Please refer to FIG. 1A, which is a 3-D schematic drawing of a scanning module according to the prior art. A scanner 11 composes: a body 15, an optical chassis 12, a document window glass 13, two guiding rods 14, a power supply 16, and a cover 17. The optical chassis 12 is a bar type module having therein a linear light source 121. The power of the optical chassis 12 is supplied by the power supply 16 such that the optical chassis 12 move along the direction of the guiding rod 14 so as to perform an image scanning process on a manuscript (not shown) arranged on the document window glass 13. The cover 17 is used to cover the document window glass 13 during the scanning process for fixing the scanning manuscript and preventing the background light from entering into the scanning area such that the clarity and contrast of scanning are deteriorated. Please refer to FIG. 1B, which is a side view of FIG. 1A. As seen, an optical path is formed starting from a light of the light source 121 arranged inside the optical chassis 12 is directed on a manuscript on the document window glass 13, and the light is then reflected back to the optical chassis 12 passing successively through a first mirror 151, a second mirror 153, and a third mirror 155, and then finally is fed into a CCD 159 through a lens 157. The optical chassis 12 must move from the left to the right to scan the manuscript. According to the above description, due to the fact that the optical chassis 12 in the prior art has a shape of a cuboid and the CCD 159 is a "linear" imaging module, the optical chassis 12 having therein the CCD 159 needs to be moved from the most left to the most right of the document window glass 13 in order to acquire the entire image. In this regard, the body 15 will require more space therein. Moreover, the length of the light source 121 (typically a fluorescent tube) has to match the width of the document window glass 13. A light source 121 that is overly long not only takes up space but also consumes more power.

Figure 1B:
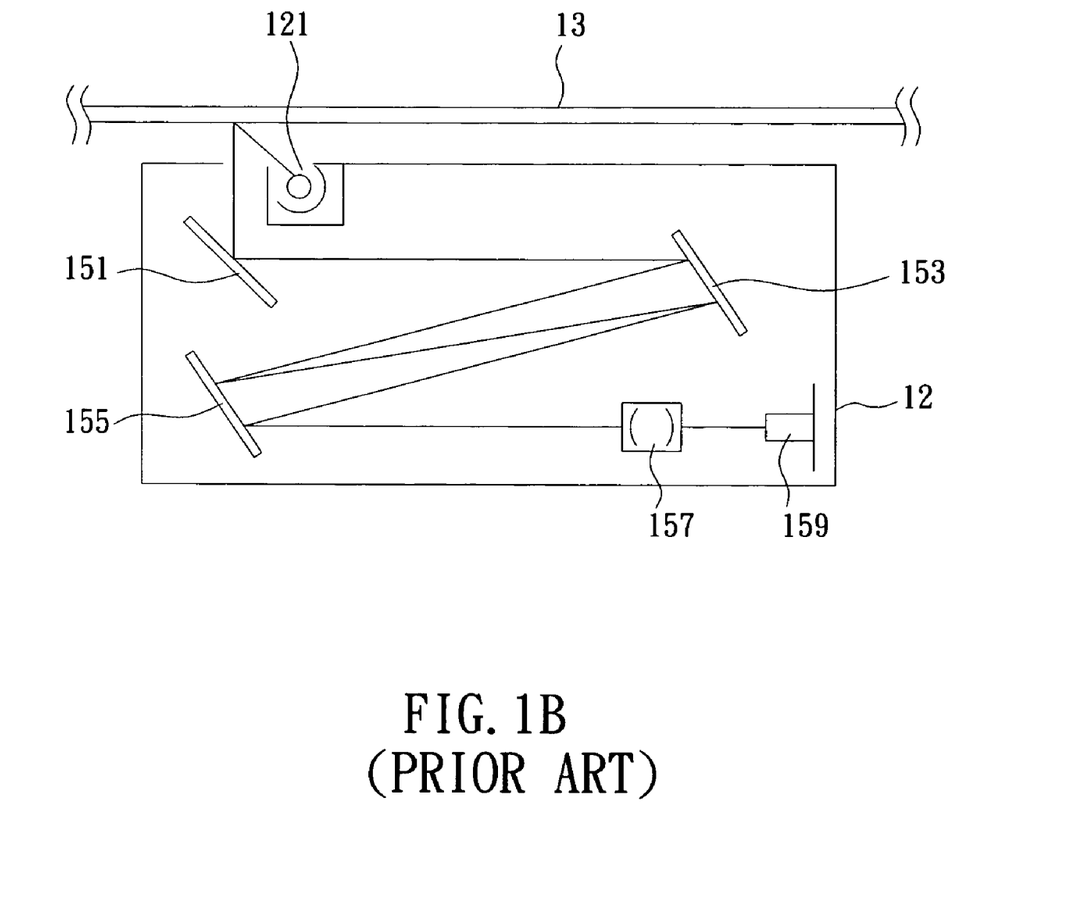
FIG. 1B is a side view of FIG. 1.

In the optical path shown in FIG. 1B, because of the imperfect design in the optical shielding, a portion of the light emitted from the light source 121 can enter the CCD 159 and mix with the reflected light of image, which will affect the quality of the outputted image. Therefore, how to filter out the unwanted light in order to get a purified light will be another important subject addressed in present invention.

Besides, since the conventional scanners all have a design with a fix optical length, meaning that the positioning of mirrors, lens, and CCD are all fixed, only documents with specific size such as A4, A3, etc., can be scanned, furthermore, the documents have to be able to be placed on the document window glass 13 such that a scanning process can proceed. The scanners of prior arts are not capable of performing scanning utilizing the technique of variable focal length (i.e. varying the length of the optical path). Based on the current techniques of the scanners and the design of the optical components, to design an optical path that can vary in focal length in order to achieve the "projection scanning" similar to a digital camera is another important subject of the present invention.

SUMMARY OF THE INVENTION

The primary object of the present invention is to provide a scanning module of smaller size that is capable of performing a scanning process with less power consumption.

The second object of the present invention is to provide a scanning module having a special filtering design that filters and purifies the reflected light of scanning object, and consequently, has a better scanning quality.

The third object of the present invention is to provide a scanning module capable of utilizing a lower cost linear scanning module to perform the "projection scanning" method on a larger area and further achieve the function similar to a digital camera.

DETAILED DESCRIPTION OF THE PREFERRED EMBODIMENT

Figure 2:
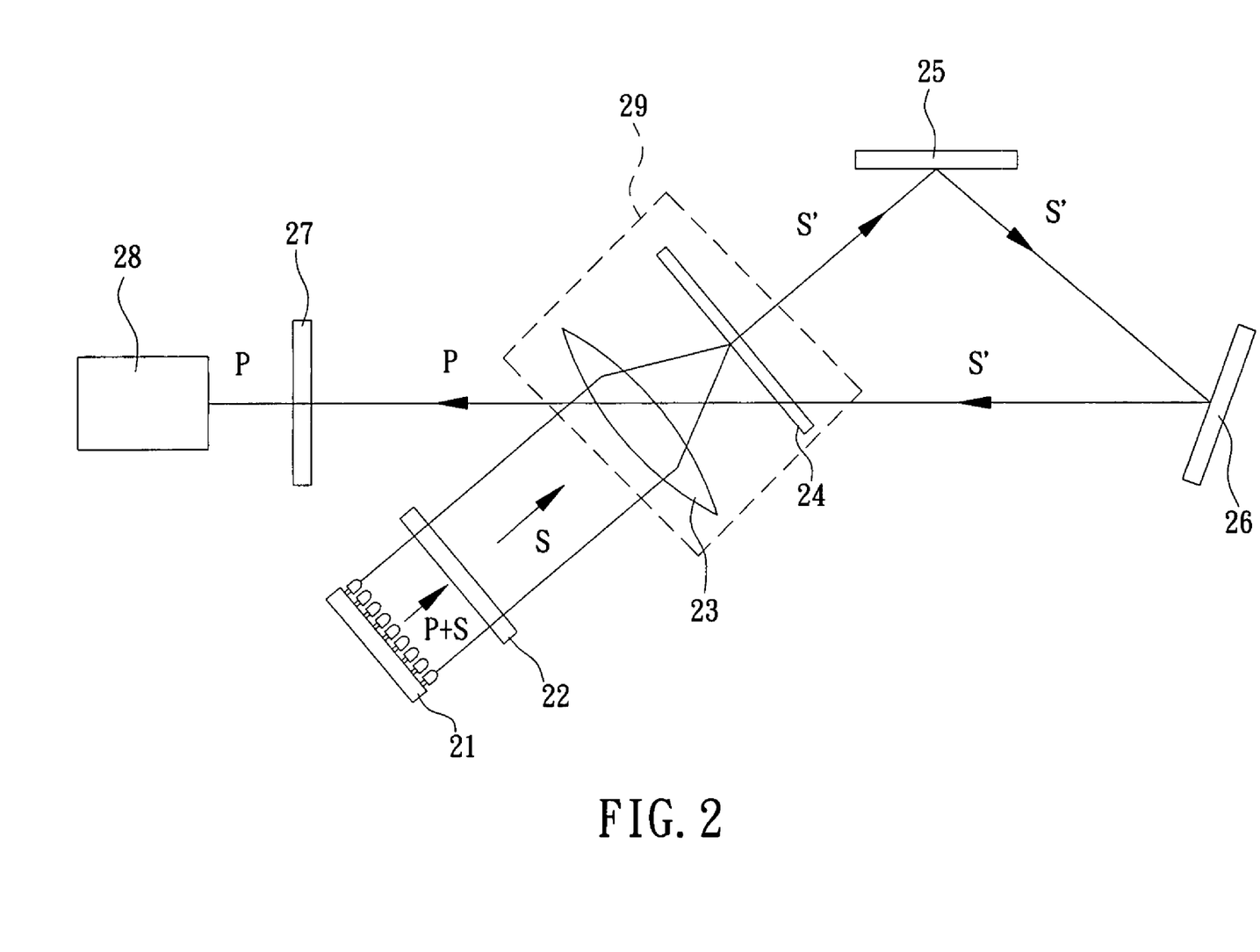
FIG. 2 is a drawing of a scanning module depicting a first preferred embodiment of the present invention.

Please refer to FIG. 2, which is a drawing of a scanning module depicting a first preferred embodiment of the present invention. The scanning module comprises: a light source 21, a first polarizer 22, an optics unit 29, a mirror 25, an image detection device 28, and a second polarizer 27. The light source 21 (In the present embodiment, the light source 21 consists of a plurality of LEDs forming a linear light source, on the other hand, other types of linear light sources may also be used) produces a dual-polarized light containing a first-polarized light and a second-polarized light that are the P-polarized and the S-polarized light respectively, or vice versa, and are orthogonal to each other.

The first polarizer 22 is placed in front of the light source 21 that only allows the first-polarized light to pass through. When the dual-polarized light passes the first polarizer 22, only the first-polarized light can pass through while the second-polarized light is rejected. The first polarizer 22 is either a P-polarized or S-polarized plate polarizing beam splitter (or a polarizing beam splitter cub). The optics unit 29 directs the first-polarized light to a scanning object 26 and transforms the reflected light into the second-polarized light before redirecting it to the image detection device 28. The optics unit 29 is composed of a lens 23 and a quarter-wave plate 24 which both are placed on the path of the first-polarized light such that the lens 23 can focus the first-polarized light to the scanning object 26 and the quarter-wave plate 24 can shift the light by a quarter wavelengths.

By receiving the second-polarized light, the image detection device 28 is capable of acquiring the image of the object 26. The second polarizer 27 is placed between the optics unit 29 and the image detection device 28, which only allows the second-polarized light to pass through. The second polarizer 27 is either a P-polarized or S-polarized plate polarizing beam splitter (or a polarizing beam splitter cube).

In the present preferred embodiment, the first-polarized light is the S-polarized light and the second-polarized light is the P-polarized light, or vice versa if desired. In this regard, the light source 21 produces the light containing both the P-polarized and S-polarized light when the scanning module is activated. The light first passes the first polarizer 22 and the P-polarized light is filtered out such that only the S-polarized light is passed. The passing S-polarized light is then focused by the lens 23 and phase shifted by the quarter-wave plate 24. As the S-polarized light passes through the quarter-wave plate 24, the phase thereof will be shifted by a quarter wavelength and the resulting is indicated by S'. The placement of the lens 23 and the quarter-wave plate 24 is interchangeable because the combined effect remains the same. The S' light is then directed by the mirror 25 to a scanning object 26. After the image of the scanning object 26 is acquired, the S' and the reflected light from the object 26 will again pass the same quarter-wave plate 24. As the result, the S-polarized light in total will be shifted by half wavelength in phase and become the P-polarized light. This P-polarized light will pass the lens 23 and the second polarizer 27 before entering the image detection device 28. At this moment, the light that detected by the image detection device 28 is purely the P-polarized light. By utilizing the polarization characteristics of the first polarizer 22 and the second polarizer 27, the influence of the scattered light of the light source 21 radiating on the image detection device 28 is eliminated. Therefore, the light source and the image detection device can be placed together or in adjacent to save space in a space limited environment (i.e. the dimension of the light source 21 can be reduced to the same or similar to that of the image detection device 28), and assure the image detection device 28 is not influenced by the light source 21 at the same time. Besides, as the scanning module of the present invention is embodied in a scanner (not shown), the emission area of the light source 21 does not required to match with the size of the scanning object. That is, by using the optical property of the lens 23, the illumination area can be enlarged while the size of the light source can be reduced.

Moreover, the noise and the undesired wavelengths in light that deteriorate the output image quality are purified and filtered using the combination of the first polarizer 22, the quarter-wave plate 24, and the second polarizer 27. The purification is done especially by the second polarizer 27, which only allows the P-polarized light to pass through and rejects others. Therefore, the present embodiment is suitable for areas in engineering that demand a very high resolution.

Figure 3:
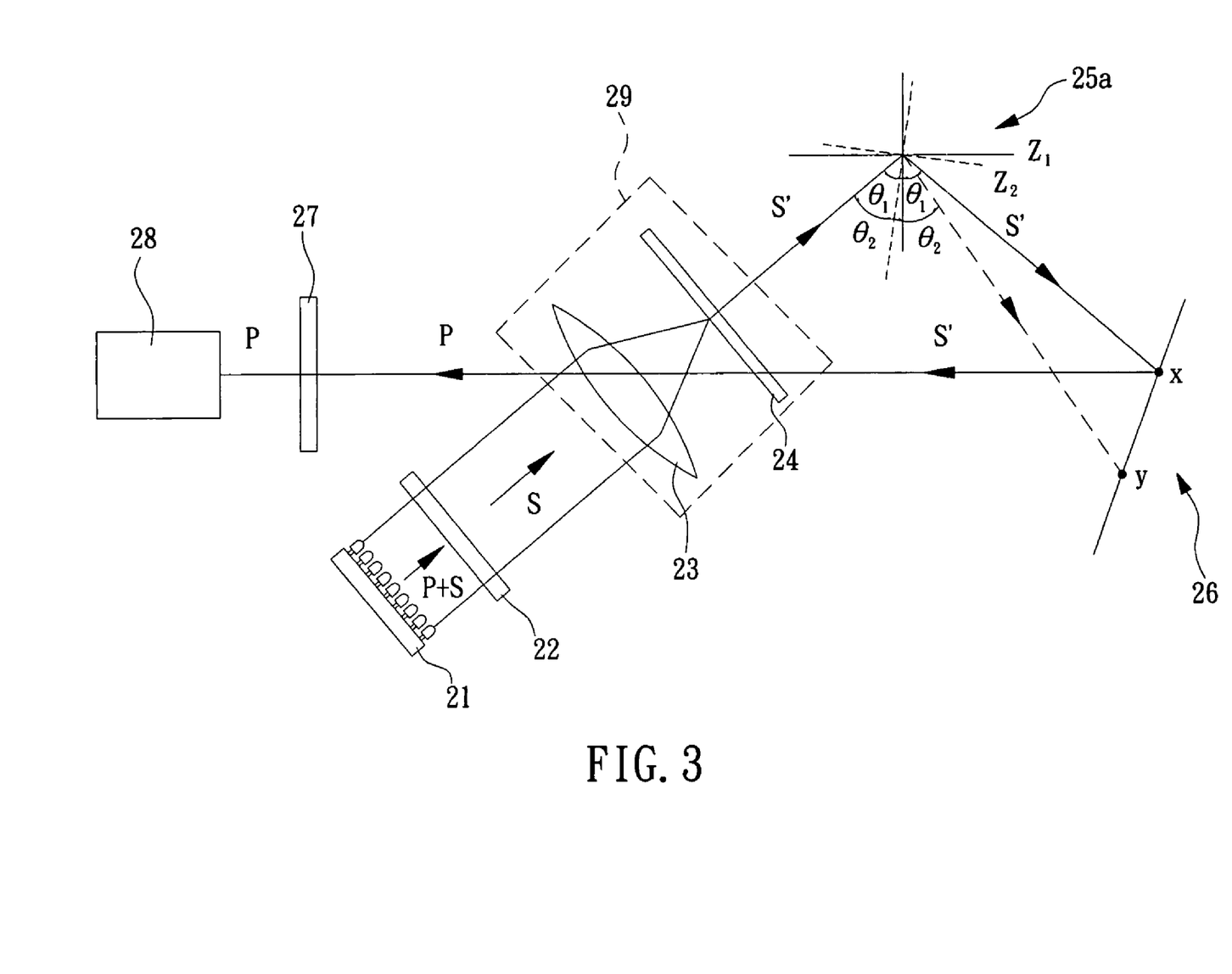
FIG. 3 is a drawing of a scanning module depicting a second preferred embodiment of the present invention.

Please refer to FIG. 3, which a drawing of a scanning module depicting a second preferred embodiment of the present invention. The scanning module comprises: a light source 21, a first polarizer 22, an optics unit 29, a rotary mirror 25a, an image detection device 28, and a second polarizer 27. The difference between the present preferred embodiment and the first preferred embodiment is in the usage of the rotary mirror 25a. The rotary mirror 25a is placed on the optical path of the first-polarized light and is driven by a driven device (not shown) to rotate with a proper rate. The incident angle of the first-polarized light to the rotary mirror 25a varies with time as the rotary mirror 25a rotates. Assuming the incident angle of the S' light, which is the first-polarized light with a quarter wavelength phase shift, is θ 1 and the rotary mirror 25a is at position Z1, according to the principle of optics, the reflection angle will be the same as the incident angle on the same plane, thus, the S' light will be directed to location X. Moreover, while the rotary mirror 25a rotates to position Z2, the incident angle becomes θ 2 and the reflection of the S' light moves to location Y. By rotating the rotary mirror 25a, the position of scanning can be varied. A "plane" image scanning therefore can be done with a "linear" image acquiring module (such as the CCD commonly used in the conventional flat bed scanner) using the above operation principle for increasing the area of scanning. Hence, by utilizing the unique design of the present invention, there is no need to move the scanning module. Instead, the scanning module can be fixed at a particular place and, only by rotating the rotary mirror, the "plane" image scanning of the scanning object 26 can be done. This is the effect of "projection" scanning. Other operation principles are basically the same as the one described in the first preferred embodiment without further description hereinafter.

Figure 4:
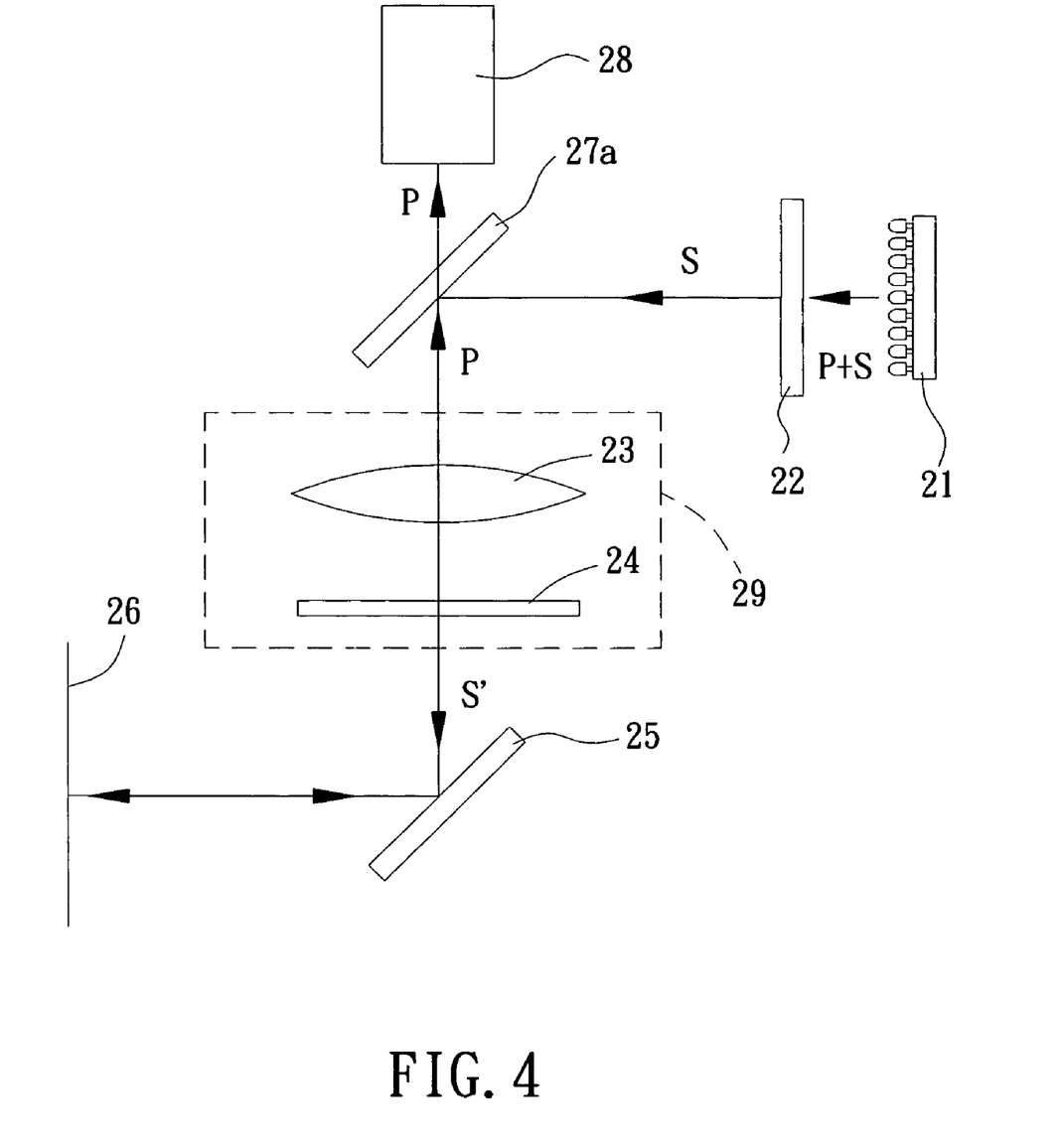
FIG. 4 is a drawing of a scanning module depicting a third preferred embodiment of the present invention.

Please refer to FIG. 4, which is a drawing of a scanning module depicting a third preferred embodiment of the present invention. The scanning module comprises: a light source 21, a first polarizer 22, a lens 23, a quarter-wave plate 24, an image detection device 28, and a second polarizer 27a. The differences between the present preferred embodiment and the first preferable embodiment are that the present embodiment has different layout and the second polarizer 27a not only allows the P-polarized light to pass through, but also reflects the S-polarized light according to the incident angle thereof for redirecting the S-polarized light to pass the lens 23 and the quarter-wave plate 24 before projecting on the scanning object 26. After acquiring the image of the scanning object 26, the reflected light passes the same quarter-wave plate again and, by passing the quarter-wave plate twice, the S-polarized light becomes the P-polarized light. The image detection device 28 acquires the image of the object by detecting the P-polarized light that passes through the lens 23 and the second polarizer 27. Similarly, the image detection device 28 in this preferred embodiment can be a "linear" image acquiring module, and a driven device can be added so that the mirror 25 can be rotate and the "plane" image of the object 26 can be scanned.

Figure 5:
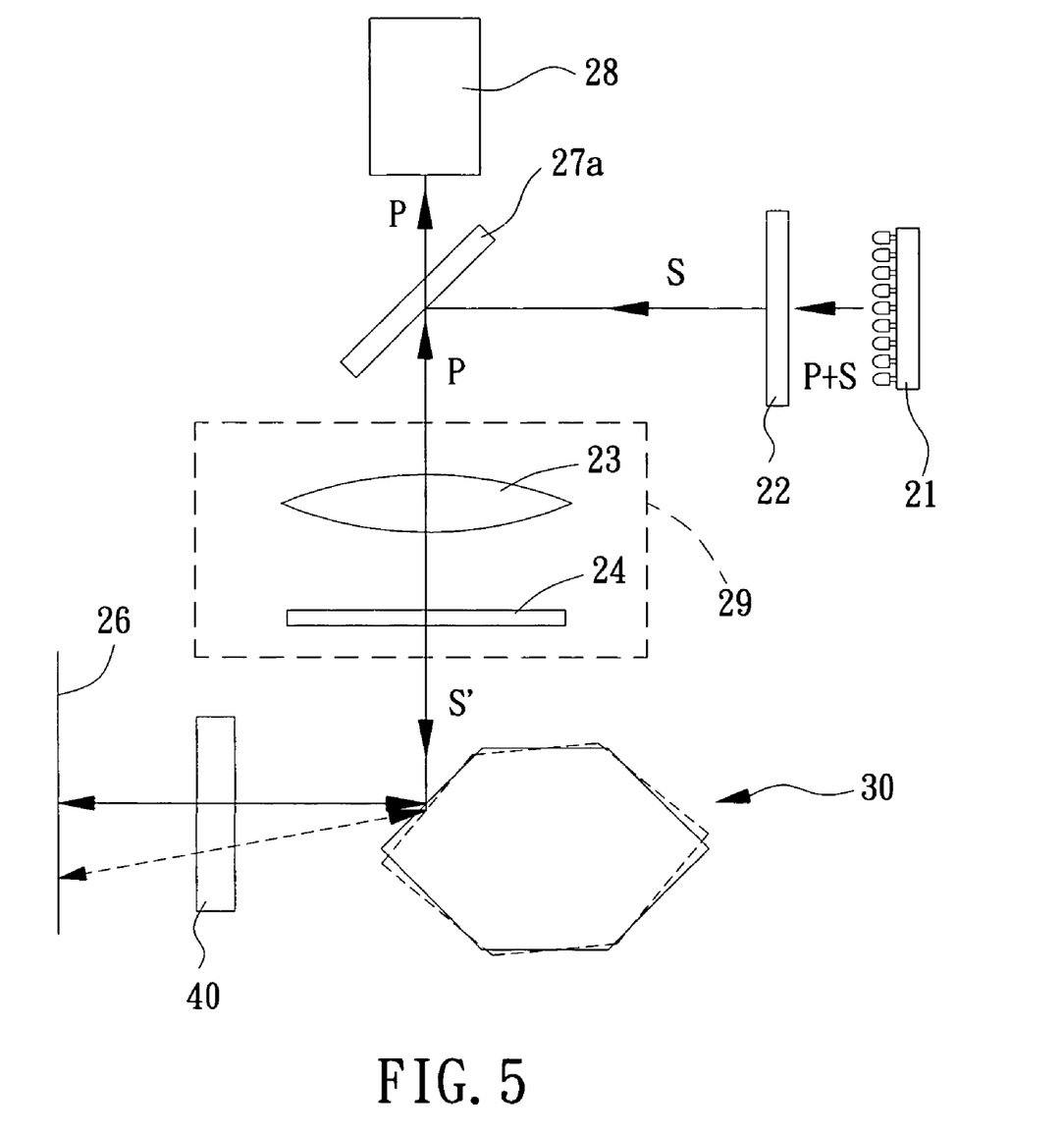
FIG. 5 is a drawing of a scanning module depicting a fourth preferred embodiment of the present invention.

Please refer to FIG. 5, which is a drawing of a scanning module depicting a fourth preferred embodiment of the present invention. The scanning module comprises: a light source 21, a first polarizer 22, an optics unit 29, a rotary mirror 25b, an image detection device 28, and a second polarizer 27. The differences between the present preferred embodiment and the second preferable embodiment are the use of a rotary mirror 25b with a hexagonal reflection surface and an additional alignment lens 50. The rotary mirror 25b rotates with a proper rate so that the incident angle of the first-polarized light to the rotary mirror 25b varies with time in order to perform the "plane" scanning. The alignment lens 50 is used to improve the linearity of the angle of the incident light from the rotary mirror 25b to the object while rotating in order to achieve a greater scanning area. By utilizing this technique, the scanning module of the present invention is able to have the function that similar to a "digital video". In another word, a specific "plane" will be scanned in the process of the rotation of a specific reflection plane of the rotary mirror 25b that has a hexagonal reflection surface (or six mirrors), where the image of that "plane" can be acquired by the image detection device 28 (which can be a "linear" image acquiring module, such as the CCD in the conventional flat bed scanner). As a consequence, while the rotary mirror 25b rotates in a direction with a specific rate, such as three revolutions per second, the image detection device 28 will then acquire the image of such "plane" 18 times repetitively in one second. A file of the dynamical image of the "plane" can be acquired, which therefore can be used as a "digital video". Compared with the conventional "flat bed scanner" that can only acquire a stationary plane image in scanning and the "digital video" that requires the high-cost "two-dimensional (plane) image acquiring module", there is no doubt about the improvement of the present invention, which achieves the performance of the dynamical imaging as in a "digital video" by using only a "linear" image acquiring module.

Figure 6A:
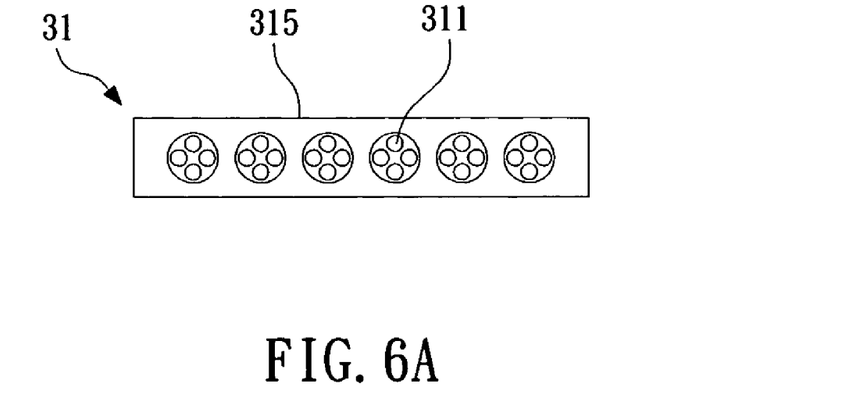
FIG. 6A is a top view of the light source according to the first preferred embodiment of the present invention.
Figure 6B:
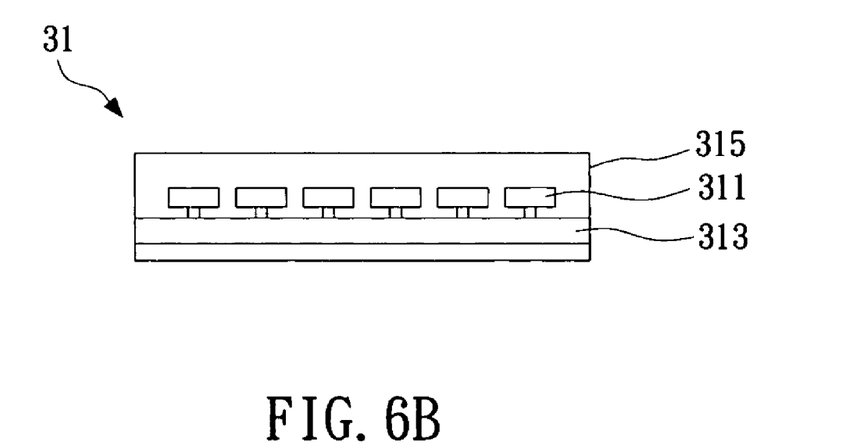
FIG. 6B is the side view of the light source according to the first preferred embodiment of the present invention.

Please refer to FIG. 6A, which is a top view of the light source according to the first preferred embodiment of the present invention. The LED-grain module 31 consists of a LED-grain bundle 311, a LED-grain base 313 (not shown in the figure), and a shell 315. Each LED-grain bundle consists of plural LEDs to increase the intensity of the light. Also because of the light intensity of the LED-grain bundle 311 is much stronger than a conventional light source, the size of the LED-grain module 31 is much smaller. FIG. 6B is the side view of the light source according to the first preferred embodiment of the present invention. Each LED-grain bundle 311 is planted into the LED-grain base 313 for firmness and is connected to a power supply (not shown in the figure).

Figure 7:
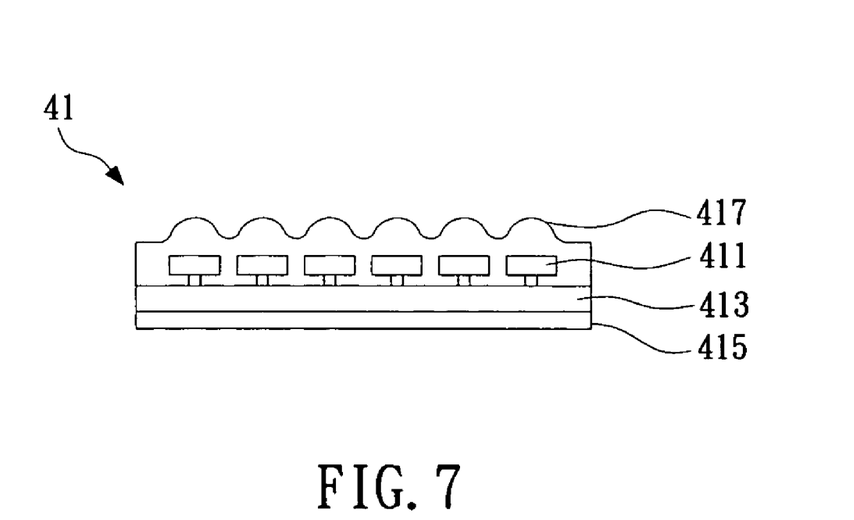
FIG. 7 is the side view of the light source according to the second preferred embodiment of the present invention.

Please refer to FIG. 7, which is the side view of the light source according to the second preferred embodiment of the present invention. This embodiment is a modified structure of the first preferable embodiment, where the LED-grain module 41 consists not only a LED-grain bundle 411, a LED-grain base 413, a shell 415, but also in addition a light shade 417. The former three components have the same features as those described in the first preferable embodiment. The light shade 417, however, has a surface that collimates the output light. The surface of the light shade 417 has several convex lens distributed evenly according to the position of each LED-grain bundle to enhance its output performance.

Figure 8:
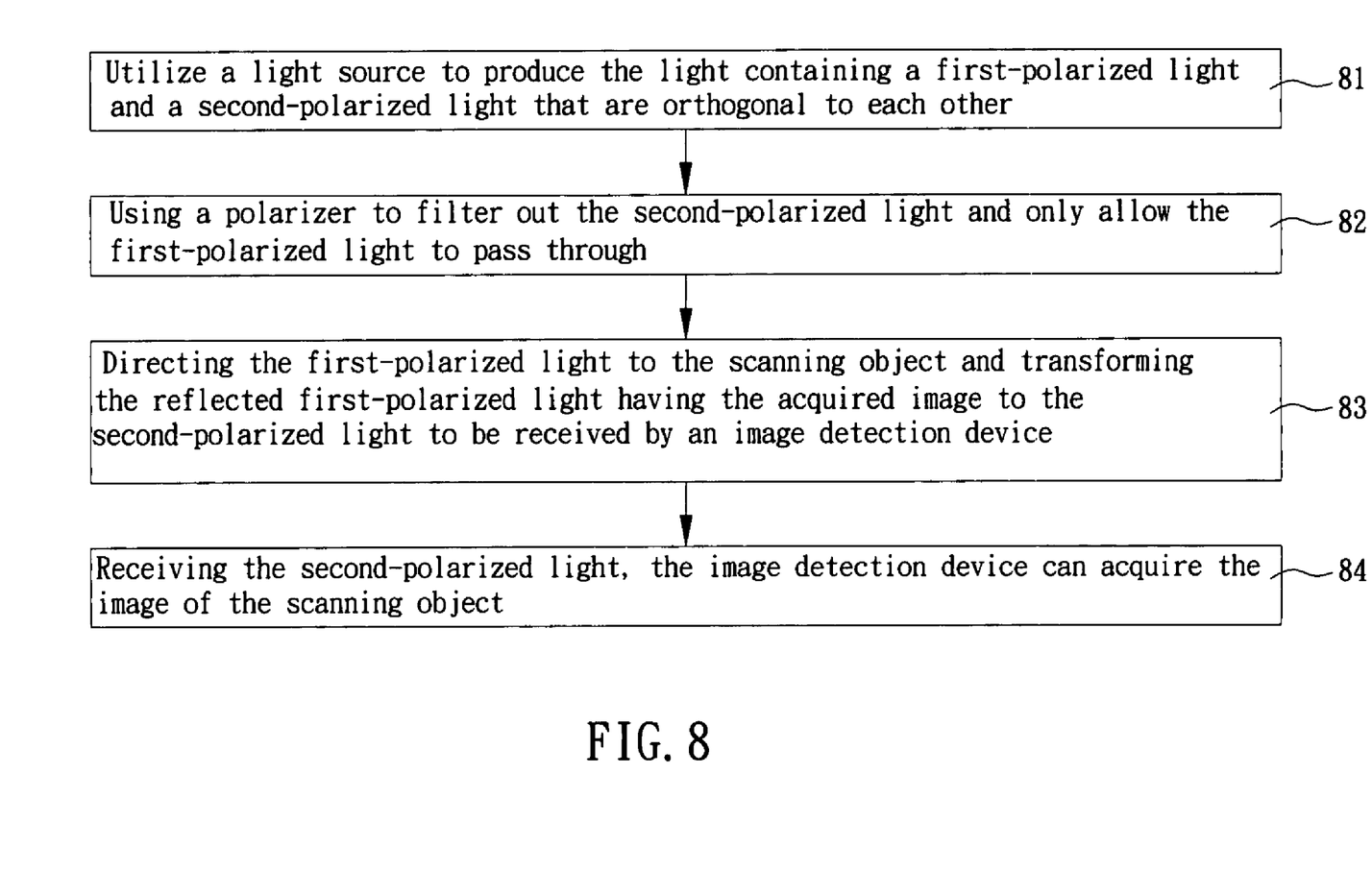
FIG. 8 is a flowchart of the present invention.

Please refer to FIG. 8, which is a flowchart of the present invention comprising the following steps:

Step 81: Utilize a light source to produce the light containing a first-polarized light and a second-polarized light (a P-polarized and a S-polarized light) which are orthogonal to each other;

Step 82: Using a polarizer to filter out the second-polarized light and only allow the first-polarized light to pass through;

Step 83: Directing the first-polarized light to the scanning an object and transforming the reflected first-polarized light having the acquired image to the second-polarized light to be received by an image detection device; and Step 84: Receiving the second-polarized light the image detection device can acquire the image of the scanning object, where the image detection device can be a CCD or a CMOS detector.

wherein, the transformation of the polarization is done by a quarter-wave plate in the way that the first-polarized light will be fed to the quarter-wave plate before projecting on the object and the reflected light thereof will pass the same quarter-wave plate again and be transformed into the second-polarized light, the process will have a total of a half wavelength phase shift before entering the image detection device.

Figure 9:
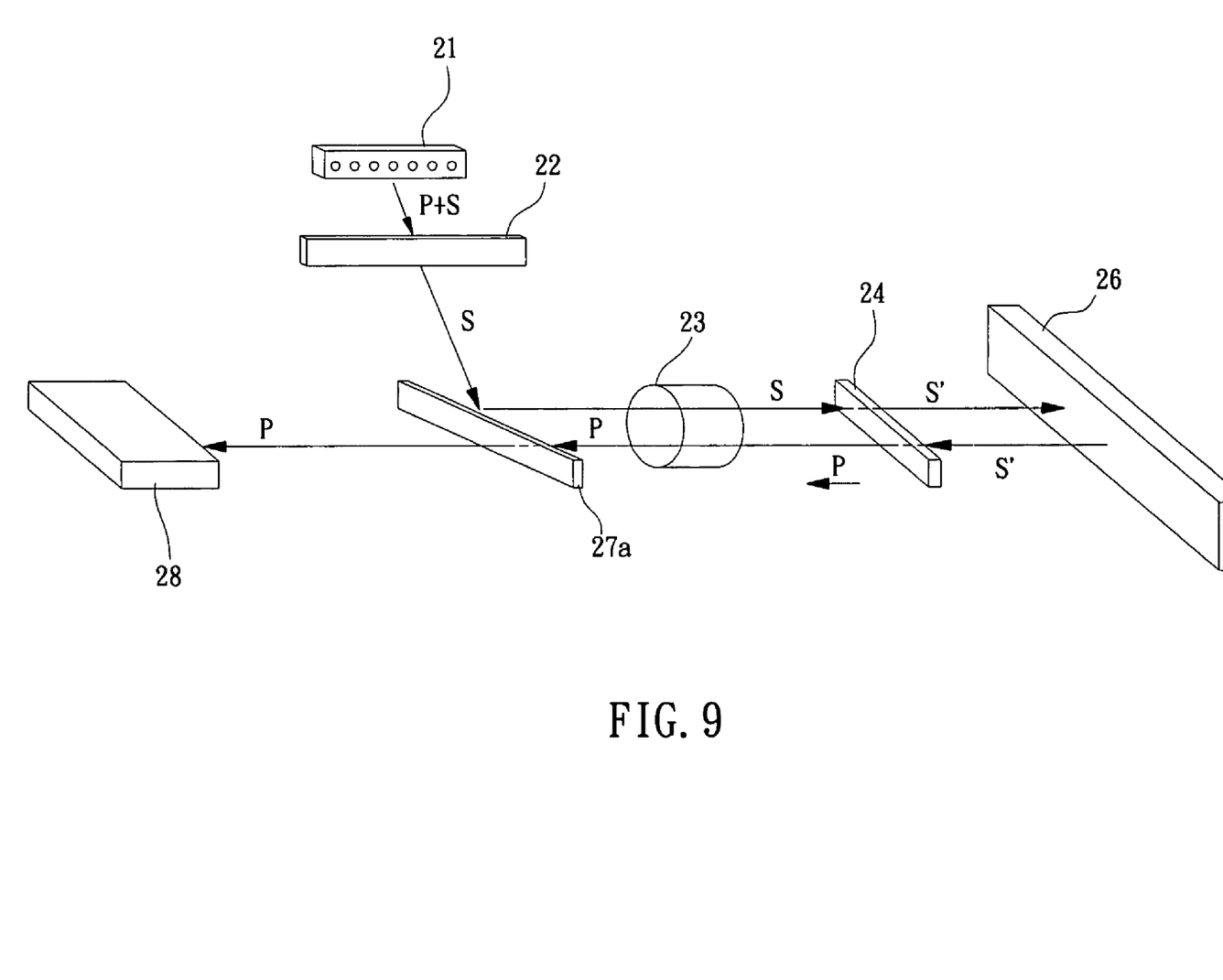
FIG. 9 is 3-D schematic drawing of a scanning module according to the third preferred embodiment shown in FIG. 4.

Please refer to FIG. 9, which is 3-D schematic drawing of a scanning module according to the third preferred embodiment shown in FIG. 4. The second polarizer 27a used here not only reflects the light from the light source to the object 26 waiting to be scanned, but also separates the light with different polarizations. Together with the effects of focusing and magnifying from the lens 23, the image of the object 26 waiting to be scanned acquired not only has a higher resolution (according to the Fourier optics theory, with the same geometrical optics structure, the resolution of image is higher when using a polarized light than using a non-polarized light), but the scale of the image scanned is also not restricted to the 1:1 ratio as in the conventional technique. Because of the polarization effect (polarization filtration), the image is better purified. This embodiment is applicable for scanning a larger object, which the principle is similar to a projector that can scan objects locate at 3 meters away and without restrictions in size up to several meters by meters (surely a sufficient light intensity and an adequate projection distance, or a proper environment such as dark room, are necessary). Therefore, this "projection scanning" indeed has advantages over the prior art.

Figure 10:
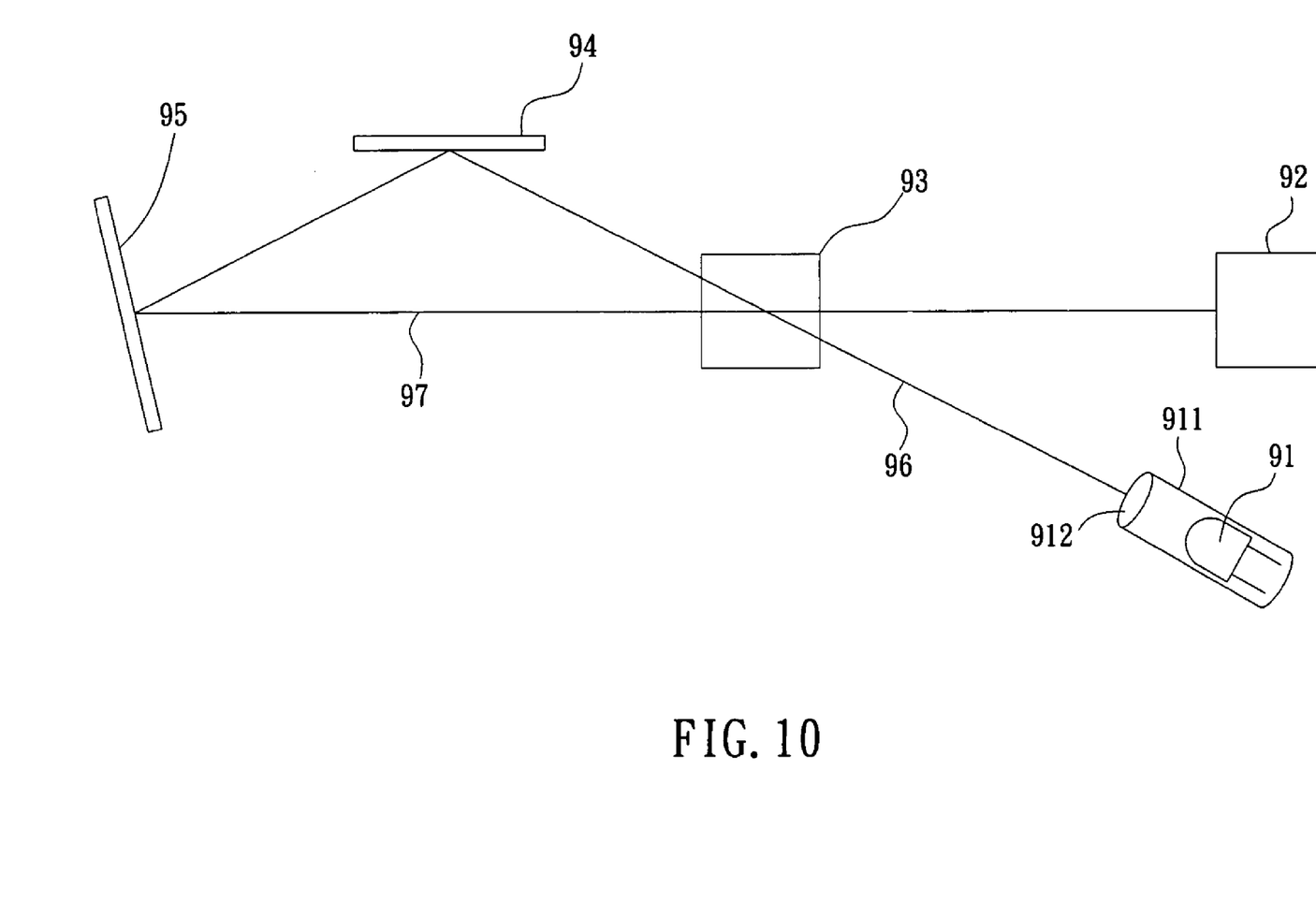
FIG. 10 is a drawing of a scanning module depicting a fifth preferred embodiment of the present invention.

Please refer to FIG. 10, which is a drawing of a scanning module depicting a fifth preferred embodiment of the present invention. The scanning module comprises: a light source 91, an image detection device 92, a lens unit 93, and a mirror 95. The light source 91 can produce a beam of light and is surrounded by an open-ended cylindrical shade 911 with an opening 912. The beam passes the opening 912 and propagates along a first optical path 96 to the lens unit 93, which focuses and directs the beam to the mirror 94 and then the beam is reflected to the object 95 waiting to be scanned. The reflected light from the object 95 propagates along a second optical path 97 to the image detection device 92, which acquires the image of the object 95. In this embodiment, by blocking the leakage light from the light source 91 to the image detection device 92 with the open-ended cylindrical shade 911, a setup with the polarizing beam splitter and quarter-wave plate is no longer necessary.

The above-mentioned embodiments are only the preferable embodiments. The scope of the present invention surely is not limited by the embodiments shown. Therefore, any small variation and modification based on the appended claims that possesses the merit of the present invention should be considered within the scope and the spirit of the present invention.

What is claimed is:

1. A scanning module, comprising:
a light source, capable of producing a dual-polarized light containing a first-polarized light and a second-polarized light;

an image detection device;

an optics unit;

a first polarizer, arranged in front of said light source, and allowing only the first-polarized light to pass through; and a second polarizer, arranged between said optics unit and said image detection device, and allowing only said second-polarized light to pass through;

wherein, said optics unit focuses said first-polarized light onto a scanning object and transforms a reflected light of said first-polarized light reflected by said scanning object into said second-polarized light for said image detection device to receive and therefore acquire the image of said scanning object; and wherein the first-polarized light and second-polarized light have orthogonal polarization states.

2. The scanning module of claim 1, wherein the optics unit comprise a lens that is placed along the optical path of the first-polarized light for focusing thereof onto said object to be scanned.

3. The scanning module of claim 1, wherein the optics unit comprise a quarter-wave plate that is placed along the optical path of the first-polarized light quarter-wave plate for shifting the phase of the passing first-polarized light by a quarter wavelength, such that said reflected light of said first-polarized light reflected from said scanning object will pass said quarter-wave plate again and be transformed into said second-polarized light.

4. The scanning module of claim 1, wherein the size of said light source is similar to that of said image detection device, and the placement of said light source matches is close to said image detection device.

5. The scanning module of claim 1, wherein said light source consists of at least one LED.

6. The scanning module of claim 1, wherein said light source is a linear light source producing said dual-polarized light composed of a P-polarized light and an S-polarized light.

7. The scanning module of claim 1, wherein the first polarizer is a polarizing beam splitter and wherein the optics unit focuses said second-polarized light onto the polarizing beam splitter, the polarizing beam splitter oriented to reflect the second polarized light onto the image detection device.

8. A scanning module, comprising:

a light source, capable of producing a dual-polarized light containing a first-polarized light and a second-polarized light;

an image detection device;

an optics unit;

a first polarizer, arranged in front of said light source, and allowing only the first-polarized light to pass through; and a second polarizer, arranged between said optics unit and said image detection device, and allowing only said second-polarized light to pass through;

wherein, said optics unit focuses said first-polarized light onto a scanning object and transforms a reflected light of said first-polarized light reflected by said scanning object into said second-polarized light for said image detection device to receive and therefore acquire the image of said scanning object; and wherein the type of said first and second polarizers is one of the following: a plate type polarizing beam splitter and a prism type polarizing beam splitter, and the polarization of said first polarizer is opposite to that of said second polarizers that respectively is one of the following: P-polarizations and S-polarization.

9. A scanning module, comprising:

a light source, capable of producing a dual-polarized light containing a first-polarized light and a second-polarized light;

an image detection device;

an optics unit;

a first polarizer, arranged in front of said light source, and allowing only the first-polarized light to pass through; and a second polarizer, arranged between said optics unit and said image detection device, and allowing only said second-polarized light to pass through;

wherein, said optics unit focuses said first-polarized light onto a scanning object and transforms a reflected light of said first-polarized light reflected by said scanning object into said second-polarized light for said image detection device to receive and therefore acquire the image of said scanning object;

wherein the optics unit comprise a quarter-wave plate that is placed along the optical path of the first-polarized light quarter-wave plate for shifting the phase of the passing first-polarized light by a quarter wavelength, such that said reflected light of said first-polarized light reflected from said scanning object will pass said quarter-wave plate again and be transformed into said second-polarized light; and wherein said optics unit further comprises a rotary mirror arranged along the optical path of said first-polarized light for changing the incident angle of said first-polarized, and consequently having different scanning areas, such that said image detection device of linear nature can be used to acquire an image of said scanning object.

10. The scanning module of claim 9, wherein the rotary mirror is a polygonal shaped mirror capable of being driven to rotate continuously in one direction such that said image detection device will acquire the image of said scanning object dynamically.

11. The scanning module of claim 9, wherein the optics unit further comprises an alignment lens for calibrating said rotary mirror to enable a linear variation of said incident angle.

12. A method of scanning, comprising:

utilizing a light source to produce a first-polarized light and a second-polarized light which have orthogonal polarization states;

using a first polarizer to filter out said second-polarized light;

directing said first-polarized light to an scanning object and transforming the reflected light thereof into said second-polarized light for feeding thereof to an image detection device;

using a second polarizer to filter the second polarized light, the second polarizer oriented to filter out the first-polarized light; and detecting the second-polarized light the image detection device capable of acquiring the reflected image of said scanning object.

13. The method of claim 12, wherein the means of said transforming is done by using a quarter-wave plate that is placed along the optical path of the first-polarized light for shifting the phase of the passing first-polarized light by a quarter wavelength, such that said reflected light of said first-polarized light reflected from said scanning object will pass said quarter-wave plate again and be transformed into said second-polarized light.

14. The method of claim 12, wherein said first-polarized light is one of the following: a P-polarized light and an S-polarized light, and said second-polarized light is orthogonal to said first-polarized light.

15. The method of claim 12, wherein using a first polarizing to filter out said second-polarized light comprises using a polarizing beam splitter, the method further comprising directing the second-polarized light onto the polarizing beam splitter and reflecting the second-polarized light from the polarizing beam splitter onto the image detection device.

16. A method of scanning, comprising:

utilizing a light source to produce a first-polarized light and a second-polarized light which are orthogonal to one another;

using a polarizer to filter out said second-polarized light;

directing said first-polarized light to an scanning object and transforming the reflected light thereof into said second-polarized light for feeding thereof to an image detection device; and detecting the second-polarized light the image detection device capable of acquiring the reflected image of said scanning object;

wherein said method further includes a rotary mirror arranged along the optical path of said first-polarized light for changing the incident angle of said first-polarized, and consequently having different scanning areas.

17. The method of claim 16, wherein said method further includes an alignment lens for calibrating said rotary mirror to enable a linear variation of said incident angle.

* * * * *

UNITED STATES PATENT AND TRADEMARK OFFICE
CERTIFICATE OF CORRECTION

PATENT NO. : 7,561,758 B2 Page 1 of 1
APPLICATION NO. : 10/925954
DATED : July 14, 2009
INVENTOR(S) : Huang It is certified that error appears in the above-identified patent and that said Letters Patent is hereby corrected as shown below:

Title Page
Item (57) Abstract, in line 14 of the Abstract, change "receiveded" to --being received--

Column 7
Line 18, change "comprise" to --comprises--
Line 22, change "comprise" to --comprises--
Line 31, delete "matches"
Line 66, change "polarizers" to --polarizer--
Lines 66-67, change "P-polarizations" to --P-polarization--

Column 8
Line 20, change "comprise" to --comprises--
Lines 30-31, change "first-polarized," to --first-polarized light,--
Line 50, change "an scanning object" to --a scanning object--

Column 9
Lines 5-6, change "polarizing" to --polarizer--

Column 10
Line 1, change "an scanning object" to --a scanning object--
Lines 10-11, change "first-polarized," to --first-polarized light,--

Signed and Sealed this

Twenty-seventh Day of October, 2009

David J. Kappos
*Director of the United States Patent and Trademark Office*